Patented May 27, 1941

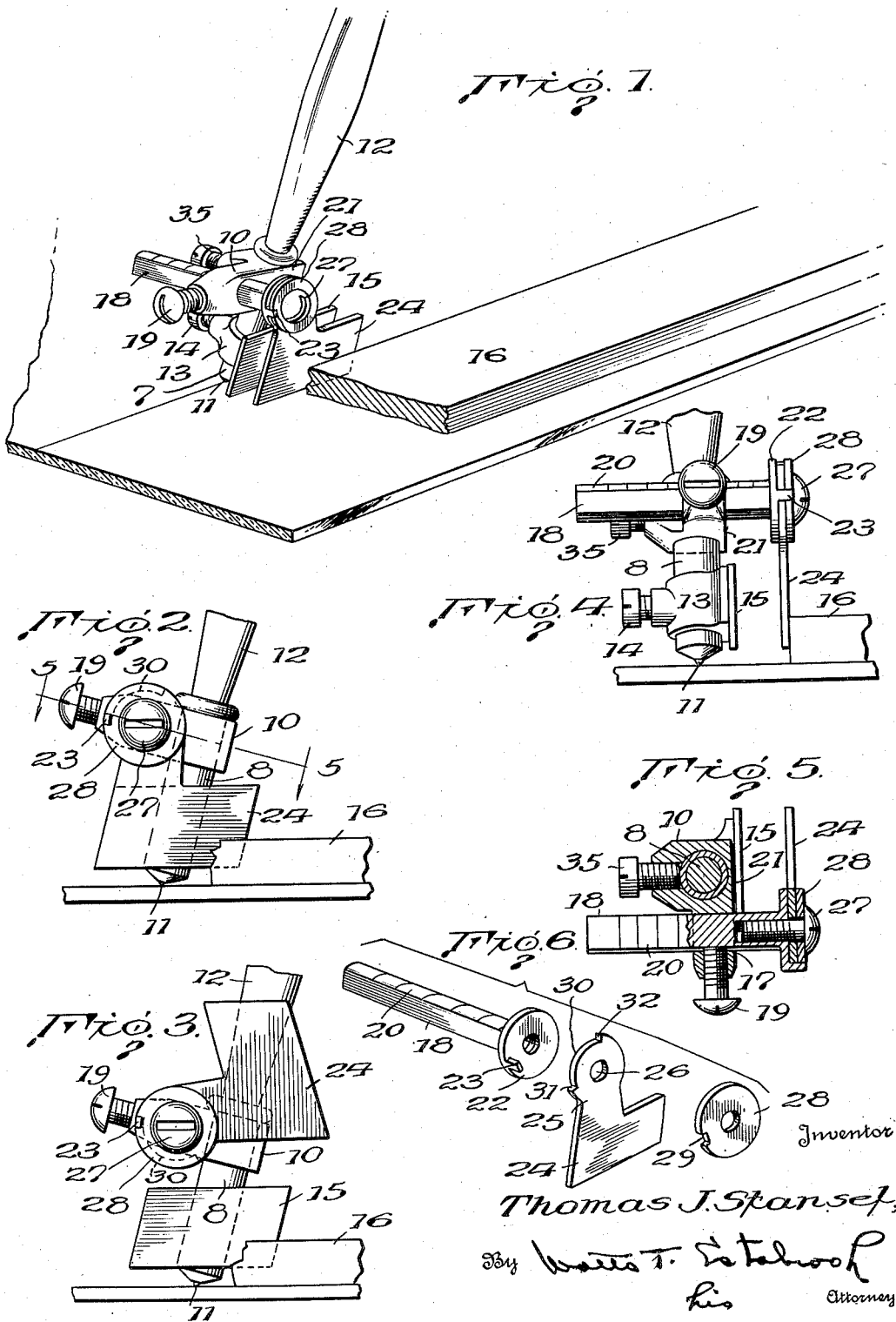

2,243,778

UNITED STATES PATENT OFFICE 2,243,778

GLASS CUTTER

Thomas J. Stansel, Clarksburg, W. Va.

Application April 2, 1940, Serial No. 327,535

5 Claims. (Cl. 49—52)

This invention relates to an improvement in glass cutters composed of a diamond, ferrule, guide and handle, and is an attachment to the ferrule to enable professional glass cutters to cut flat glass of any size to any fraction of an inch desired.

The table employed by a glass cutter is graduated and marked off in inches so that the cutter in cutting sheets of glass may lay or apply his straight edge over the glass sheet and be governed by the scale or graduations in cutting the sheet to the desired size. These tables are not scaled or graduated for cutting the sheet to fractions of inches, and one of the purposes of this invention is to provide a guide on the ferrule which will permit the operator or cutter to use the same tool in cutting the sheet of glass to the inch scale of the table or to fractions of inches.

It is an established fact in the glass cutting trade that no two diamond cutters will cut exactly alike, and although each workman maintains a set of cutters, he is reluctant to alternate these cutters during a day's work because of the loss of time occasioned by a difference in holding of the cutter and the likelihood of breakage. That is, the cut drawn across the glass sheet must be perfect in order to get a clean break.

In cutting these sheets in fractions of an inch it has been necessary for the operator to place the sheet of glass by hand on fraction marks, which marks are graduated in the first inch on the left hand side of the table (known as the "square"), and to line the sheet by eye to these marks, place the straight edge and draw the cut on the inch. This results in much inaccuracy and great loss of time. The present invention makes provision for overcoming these objections and allows for more expeditious cutting by the operator.

The present invention provides an auxiliary or fractional guide which may be readily attached to a ferrule or diamond glass cutter and so adjusted with respect to the tool that the auxiliary guide may be brought into position for engagement with the straight-edge instead of the usual guide for cutting the sheet of glass on any fraction of an inch, and when the cut has been made can be swung to a position so that the tool may be used with the main guide in making cuts on the inch.

The invention consists of certain novel features of construction and combinations of parts which will be hereinafter set forth and pointed out in the claims.

In the accompanying drawing:

Figure 1 is a perspective view of a glass cutter with the invention attached and illustrating the manner in which it may be used;

Figure 2 is a view in side elevation showing the guide in a position for use with the glass cutter;

Figure 3 is a view in side elevation showing the guide swung to its inoperative position, and illustrating how the main guide may be used with the straight-edge;

Figure 4 is a view in front elevation;

Figure 5 is a sectional view taken on line 5—5 of Figure 2; and

Figure 6 is a perspective view of some of the elements composing the fractional guide unassembled.

As illustrated the tool or glass cutter comprises a ferrule or body 8 having a diamond or cutter 11 mounted at one end thereof and a handle 12 at the other end by which latter the operator manipulates the tool in cutting sheets of glass. A collar 13 is removably attached to the body or ferrule 8 by a set screw 14.

The collar is provided with a guide in the form of a plate 15 rigidly attached thereto. This guide is so positioned on the body as to engage and travel alongside a straight-edge 16 as the glass cutter is drawn across a sheet of glass in the cutting operation. This guide or plate 15 is disposed with respect to the body or ferrule 8, so that when the guide is in engagement with the straight-edge 16 a sheet of glass may be cut by the operator on an inch scale. This arrangement or of a similar character is employed by glass cutters in cutting glass on an inch scale, which is the customary manner of laying off the tables for cutting glass, and the operator arranges his straight-edge by the inch scale set forth on the table in obtaining his line for cutting the glass sheet.

Mounted on the ferrule or body 8, above the collar 13 is a holder or clamp 10 comprising a ring surrounding the body 8 and held thereto by a set screw 35 which is threaded to the body and presses against the body in adjustably supporting the holder on the body. An opening 17 is formed in the holder 10 transversely thereof or at right angles to the body 8 for the reception of a bar 18 which is provided with a flat side to cooperate with a set screw 19 threaded to the holder 10 for holding the bar in any adjusted position. The upper surface of the bar 18 is provided with a scale of fractions of inches 20 so that the bar may be accurately adjusted in the distance it is projected from the side 21 of the holder 10.

One side wall of the body 10 is preferably made flat or straight so that an accurate measurement may be obtained as to just the distance the bar projects from body 10. For example, the bar 18 may be graduated $\frac{1}{32}$ of an inch. The guide 24 under the same scheme of measuring, would have a thickness equal to $\frac{1}{32}$ of an inch distance would be compensated for in the first graduation on the bar 18. Therefore, the guide 24 can be moved with respect to the body 10 to position the guide for engagement with the straight edge 16 to various distances in accord with the fractional measurement of the bar 18 and with the scale on the bar, the operator can so align or adjust the guide 24 with respect to the flat or straight wall 21 or the body 10 and be assured that the tool will be spaced the proper distance from the straight-edge and on a fraction of an inch so that the glass sheet may be cut.

Formed on an end of the bar 18 is a disk 22 having a laterally extending lug 23 at the peripheral edge thereof. An auxiliary or fractional guide 24 in the form of a plate is preferably made L-shaped, so that the bottom or rail portion is of a size and thickness conforming to the guide plate 15 used on all diamond cutters. The vertical arm 25 of the guide is provided with a hole 26 for the reception of a screw bolt 27 which has screw threaded engagement with the end of the bar 18 for holding the arm in contact with the disk 22. A washer 28 is interposed between the head of the bolt 27 and arm 25. A notch or recess 29 is formed in the edge of the washer 28 for the reception of the lug 23 to retain the washer against rotation.

The arm 25 of the guide plate 24 is provided with an arcuate recess 30 along the edge thereof and in which recess 30 the lug 23 extends. This recess is preferably disposed along one side and partially across the top of the arm so as to cooperate with the lug 23 which is located along one side of the bar 18, whereby the shoulder 31 of the recess will be engaged by the lug 23 for maintaining the guide plate in a vertical position, as shown in Figure 2. When the guide plate 24 is in this position it will engage a straight-edge 16 and act as a guide for the glass cutter as it is drawn across the sheet of glass.

When the guide plate 24 is swung to the position as indicated in Figure 2, so that it can be brought into engagement with the straight-edge 16, the set or thumb screw 19 has been released from engagement with the bar 18, and the bar has been adjusted with respect to the holder 10, for moving the guide 24 from or toward the holder the required fraction of an inch so that the sheet may be cut to the desired size. After the adjustment has been made the screw 19 is tightened for securing the bar 18 and guide 24 in the adjusted position in accord with the scale 20 on the bar, whereupon the tool is ready for use by the operator.

Upon the completion of the cut if it is desired to make the next cut on an inch scale, then the guide plate 15 will be employed and the operator will swing the guide 24 upwardly until the shoulder 32 of the recess 30 engages the lug 23, where it will be held due to the frictional engagement between the arm 25 and the disk 20 and washer 28 (Figure 3). The L- right-angular shape of the guide 24 and the frictional engagement between the elements 20, 25 and 28 insures the guide being held in its uppermost or lowermost position.

When the guide 24 is in its uppermost position, the operator can continue to use the same diamond cutter in making his cuts on the inch scale of cutting. Heretofore it has been necessary to have at least two sets of tools for the regular inch cuts and for fractional cutting, and this is a condition which is seriously objected to by the professional glass cutter, because no two glass cutters "cut" and "feel" the same to the operator and in the use of several different cutters his work is materially affected. With the present device this objection is overcome as the operator may employ the same glass cutter in all of his work whether the cutting be on an inch scale or fractional. Of course, if he happens to have little or no fractional cutting to perform the fractional guide 24 may be removed by releasing the screw 19 and withdrawing the bar 18 from the holder 10, or the holder 10, bar 18, and guide 24 may be removed from the body 8 as a unit.

I claim:

1. A glass cutter, comprising a body having a handle and a cutter, a holder mounted on said body, a bar connected to said holder and adjustable with respect thereto, a disk on an end of said bar and provided with a laterally extending lug, a rotatably frictional guide provided with an arcuate recess within which said lug extends, means for frictionally locking said guide to said disk, and shoulders on said guide at the ends of said recess for cooperation with said lug in governing the rotary movement of said guide.

2. A glass cutter, comprising a body having a handle and a cutter, a bar connected to said body and positioned above said cutter when said cutter is in cutting position, a guide for said cutter rotatably mounted on said bar having a guiding and a non-guiding position, at least the guiding portion of said guide being disposed below the bar when in said guiding position, and said guiding portion being disposed to extend in an upward direction and away from said bar when in said non-guiding position, said guide being rotatable from one of said positions to the other, and means cooperating with said guide and bar for normally maintaining said guide in either of said positions.

3. A glass cutter, comprising a body having a handle and a cutter, a bar connected to said body, a guide for said cutter rotatably mounted on said bar having a guiding and a non-guiding position, said guide being rotatable from one of said positions to the other, a lug on said bar, and means on said guide cooperating with said lug for limiting the rotation of said guide to its guiding and non-guiding positions.

4. A glass cutter, comprising a body having a handle and a cutter, a bar mounted on said body for adjustment laterally with respect to said body, a guide for said cutter rotatably mounted on said bar for movement from a guiding position to a non-guiding position, friction means on said bar for holding said guide in said positions, a lug on said bar, and means on said guide for engagement with said lug for limiting the rotary movement of said guide.

5. A glass cutter, comprising a body having a handle and a cutter, a holder mounted on said body, a bar provided with a measuring scale mounted on said holder for adjustment laterally with respect to said body and positioned above said cutter when said cutter is in cutting position, a guide for said cutter pivotally mounted on said bar having a guiding position and a non-guiding position, at least the guiding portion of said guide being disposed below the bar when in said guiding position, and said guiding portion being disposed to extend in an upward direction and away from said bar when in said non-guiding position, said guide swinging from one of said positions to the other, and means associated with said guide for holding said guide in said positions.

THOMAS J. STANSEL.